(No Model.)
T. LOESCHER & H. SCHMITH.
BOLT.
No. 459,110. Patented Sept. 8, 1891.
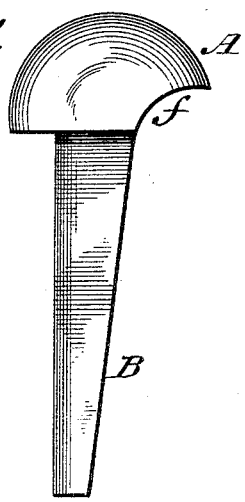
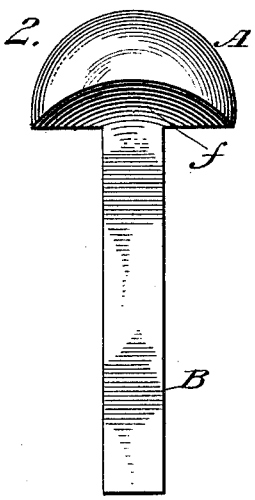
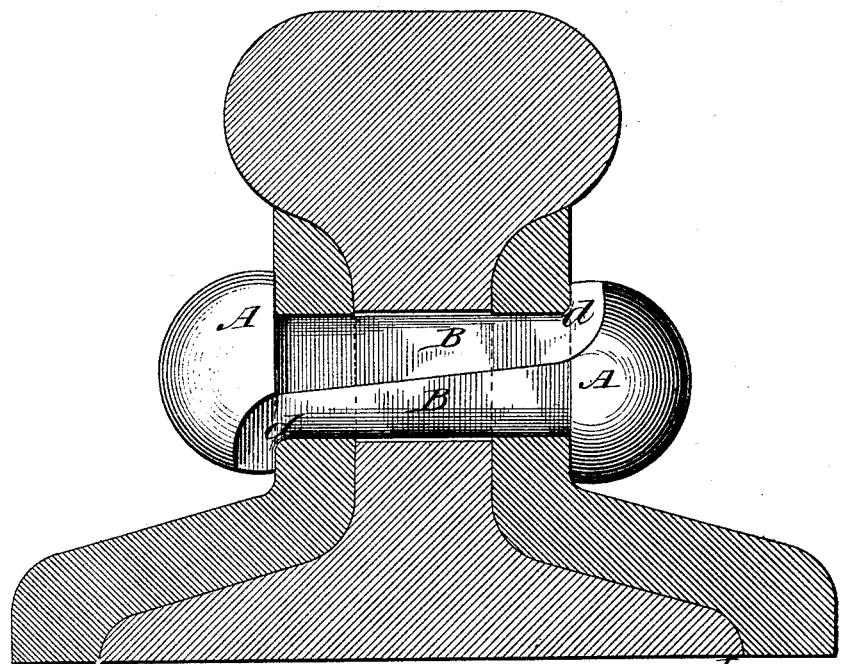
Witnesses.
Jos. C. Howell
Martin A. Ritchie
Inventors.
Theodore Loescher
Henry Schmith

UNITED STATES PATENT OFFICE.

THEODORE LOESCHER AND HENRY SCHMITH, OF LITCHFIELD, ILLINOIS.

BOLT.

SPECIFICATION forming part of Letters Patent No. 459,110, dated September 8, 1891.

Application filed December 17, 1890. Serial No. 375,037. (No model.)

*To all whom it may concern:*

Be it known that we, THEODORE LOESCHER and HENRY SCHMITH, citizens of the United States, residing at Litchfield, in the county of Montgomery and State of Illinois, have invented a new and useful Metal Wedge, Nail, or Bolt, of which the following is a specification, reference being had to the accompanying drawings, forming part of the specification.

In the drawings, Figure 1 is a side elevation of one of the bolt-sections. Fig. 2 is a face view of the same; and Fig. 3 is a sectional view through a rail-joint, showing one of the bolts in position.

The invention has relation to an improved bolt or fastening; and it consists in the novel construction and combination of parts as hereinafter specified.

The object of the invention is to provide a threadless bolt, by the use of which a perfect joint may be formed without the use of a nut or any auxiliary fastening.

In the accompanying drawings, the letter A designates the bolt, which is formed in two longitudinal oblique sections. These sections each consist of a head portion A, cut away at one side on the under portion to form a transverse segmental recess or concavity $f$. Said sections have also each tapered semi-cylindrical shank portions B B. The two sections are driven in from opposite sides of the rail or other joint, and are set firmly against each other. When the points of the two shanks strike the recesses or concavities $f$ in the head of the respective opposite section, they will be turned outwardly thereby, following the wall of said recesses, assuming a position generally at right angles to the position of the shanks. The length of the shanks and the thickness thereof is such that the points $d$ are wedged firmly between the heads of the sections and the surface of the fish-plate or other piece, said parts in such position forming part of the heads of the opposite sections and preventing any looseness of the joint. When it is desired to remove the bolt, one of the clinches or points $d$ is cut off.

We are aware that it is not new to provide a key-bolt formed in two sections, and we do not claim such a bolt, broadly; but we are not aware that a bolt has ever been formed in two longitudinal sections having oblique meeting faces, the points of each respective section being designed to enter an arc-shaped or segmental recess or concavity in the head of the opposing section, whereby said point forms a part of the head of the said opposing section, forming an angular shoulder for engagement with the fish or other plate.

What we claim is—

A key-bolt formed in two oppositely-driven sections, each section comprising a semi-cylindrical shank portion having a gradual taper on its interior face from the head to the point and a head portion forming an angular shoulder, but cut away at its under edge at one side to form an arcuate segmental transverse recess or concavity, said concavity being adapted to receive the point of the opposing section in a position at right angles to the position of the bolt, the bent portion of said opposing section forming a portion of said head and presenting an angular shoulder for engagement with the edge of the bolt-aperture, substantially as specified.

THEODORE LOESCHER.
HENRY SCHMITH.

Witnesses:
H. F. BYCRAFT,
C. C. SULLANS.